Feb. 10, 1970  R. JACKSON  3,494,363
CONTROL FOR DEVICES USED IN SURGERY
Filed April 1, 1969  3 Sheets-Sheet 1
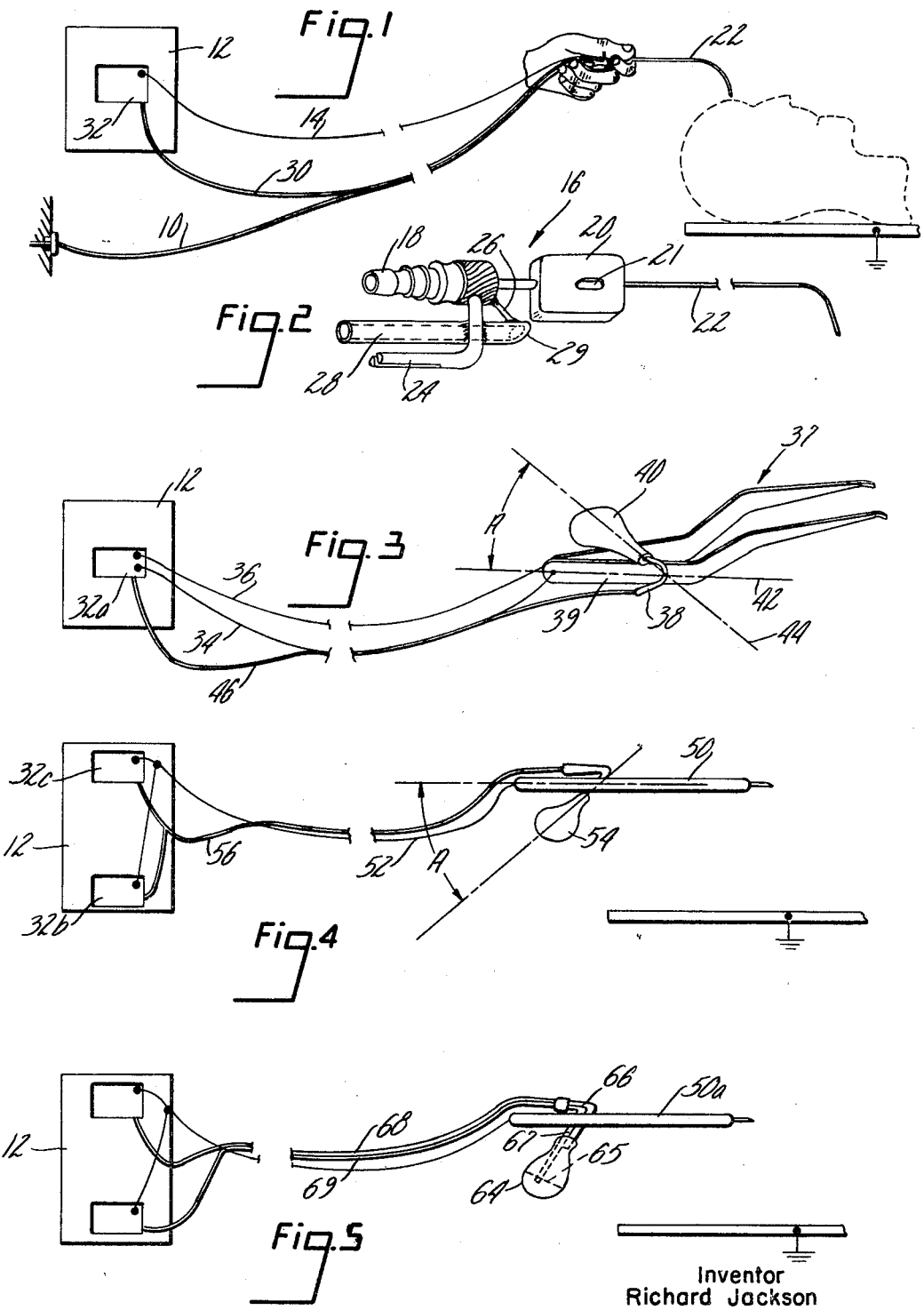
Inventor
Richard Jackson
By Kenway, Jenney - Hildreth
Attorneys

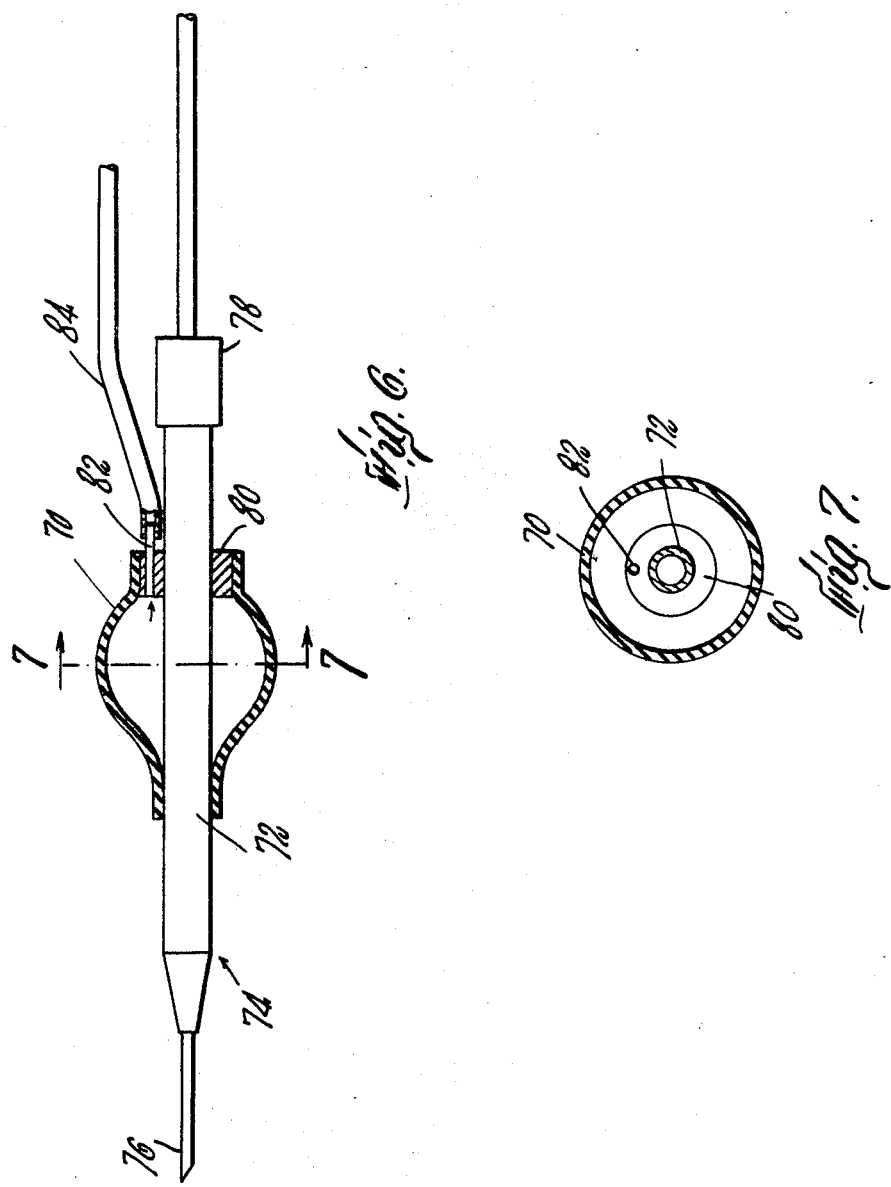

Feb. 10, 1970   R. JACKSON   3,494,363
CONTROL FOR DEVICES USED IN SURGERY
Filed April 1, 1969   3 Sheets-Sheet 3
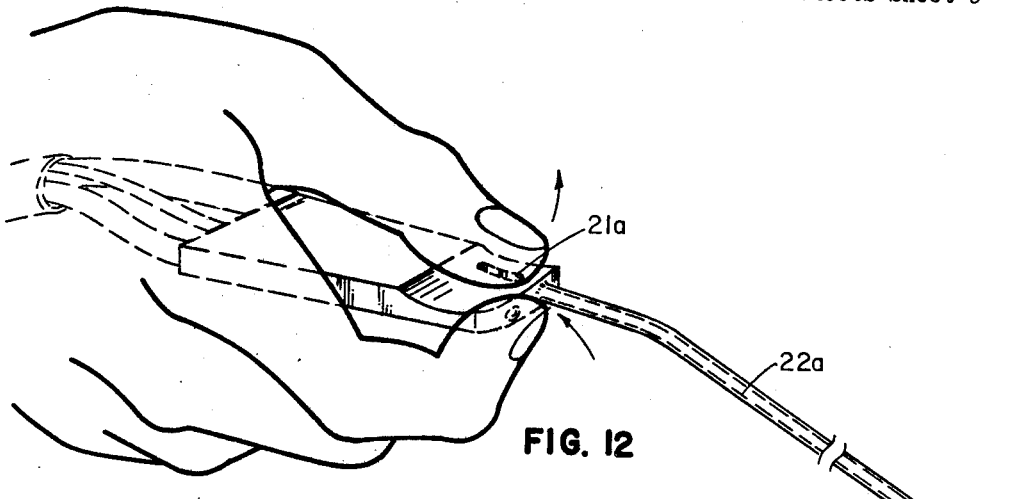
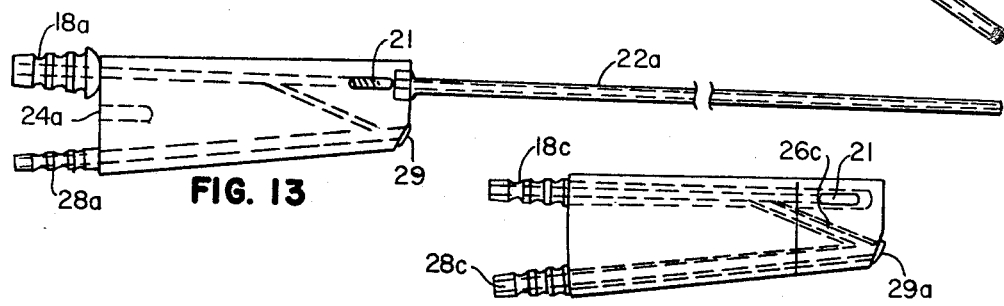
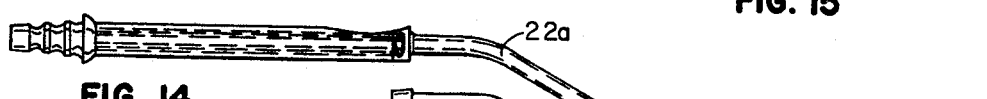
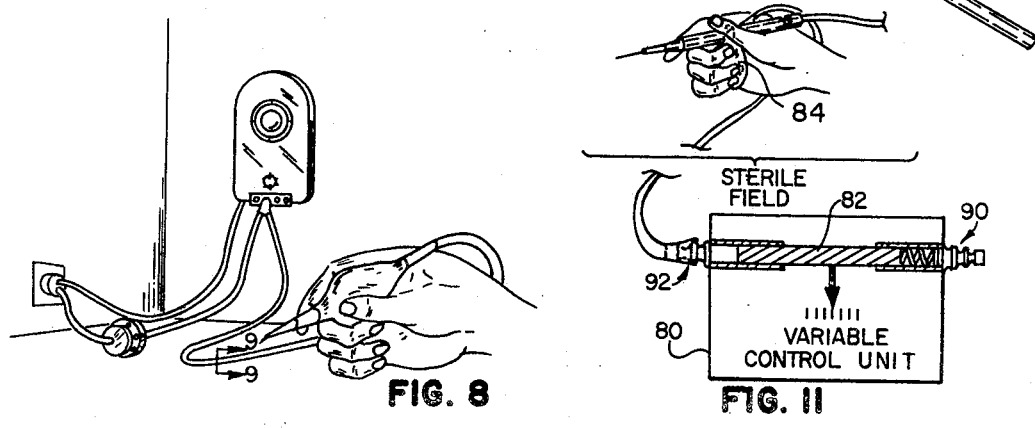

United States Patent Office 3,494,363
Patented Feb. 10, 1970

3,494,363
CONTROL FOR DEVICES USED IN SURGERY
Richard Jackson, Marblehead, Mass., assignor, by mesne assignments, to Technical Resources, Inc., a corporation of Massachusetts
Continuation-in-part of application Ser. No. 514,806, Dec. 20, 1965. This application Apr. 1, 1969, Ser. No. 814,515
Int. Cl. A61b 17/38
U.S. Cl. 128—303.14
12 Claims

ABSTRACT OF THE DISCLOSURE

Hand controls held in the sterile field are connected by flexible control lines to remote pressure responsive control units. A positive displacement member may control a plurality of modes of operation with progressive actuation movement or squeeze of the operator. A vacuum control employs a port which admits or can be closed to exclude air from the atmosphere. A single remote switch unit can be responsive to hand controlled and foot controlled squeeze bulbs and suction actuators. Electrosurgical pencils with pendant and concentric squeeze bulbs and electro-coagulating suckers incorporating the vacuum control using a bleed line are shown.

---

This application is a continuation in part of my abandoned copending application Ser. No. 514,806 filed Dec. 20, 1965.

This invention relates to control of powered devices useful in surgery and to electrical coagulating and cutting devices.

Objects of the invention are to provide control for such devices which satisfy the various and to a degree conflicting needs of convenience, simplicity, avoidance of interference with the surgical work, preservation of sterility of the surgical field, safety, ease of autoclaving and direct and positive control by the person holding or operating the device.

Another object is to provide improved hand-controlled cautery instruments for use in neurological surgery and the like.

Another object is to provide improved cautery devices of the pencil forceps and sucker types.

Another object is to provide control of powered devices through a multiplicity of operating states, and other objects will be understood from the following description in conjunction with the drawings.

According to one aspect of the invention it is realized that it would be possible, acceptable and desirable to employ a fluid line leading from the hand piece in the sterile surgical field at the operating table to a remotely located fluid pressure responsive control member and to provide means on the hand piece for actuation by the hand of the user to alter the fluid pressure in the control line. It is found that this arrangement can be instrumented very simply and can achieve reliable and rapid control, e.g. of electrical current, for electro coagulation and cutting.

According to another aspect of the invention a plurality of modes of operation are controlled by an actuator connected by a flexible control line to a remote control device that is responsive to changes in fluid pressure, so that increasing actuating movement causes actuation of the control from off position to a plurality of on positions. The invention features such a control in the form of a deflectable member defining a confined volume to transmit the change in fluid pressure.

According to another aspect of the invention it is realized that a squeeze bulb can be mounted on a hand-held device in such a convenient way that it does not interfere with the surgical work, and it can be employed to control one or a plurality of different modes of operation, for instance to permit cutting and cauterization with the same electrosurgical instrument.

According to another aspect of the invention there is a surgical control system using an actuator member adapted to be held in the sterile field that has a vacuum source and a port which can admit or exclude air from the atmosphere, for controlling the fluid pressure applied through a flexible control line to a remote pressure change responsive control member. The port may be disposed for engagement by the hand of the operator.

This invention also features electrosurgical suckers as used for neurological and other surgical work in which the means for controlling the pressure in the control line takes the simple form of a bleed from the main vacuum line that services the sucker. In one preferred embodiment there is provided simply an atmospheric port which establishes the pressure at one value in the control line. The port is made accessible to the hand of the user, and when closed, a bleed line from the main vacuum line reduces the pressure in the control line sufficiently to actuate the switch.

Other features will be revealed in connection with the following description of the preferred embodiments.

In the drawings:

FIG. 1 is a partially diagrammatic view of a preferred embodiment of a neurological sucker;

FIG. 2 is a top view on an enlarged scale of the device of FIG. 1;

FIG. 3 is a view of cautery forceps modified according to the invention;

FIG. 4 is a view of a cautery pencil modified according to the invention;

FIG. 5 is a view similar to FIG. 4 of another preferred embodiment;

FIG. 6 is a side view of another preferred embodiment;

FIG. 7 is a cross-sectional view taken on line 7—7 of FIG. 6;

FIG. 8 is a view of an embodiment, similar to that of FIG. 6 in operation;

FIG. 9 is a cross-sectional view of the control line of FIG. 9;

FIG. 10 is a side view of a foot-operated squeeze bulb;

FIG. 11 is a view of a preferred embodiment of a variable control system according to the invention;

FIG. 12 is a perspective view of another sucker according to the invention in operation;

FIGS. 13 and 14 are top and side views of the sucker of FIG. 12;

FIG. 15 is a top view of a general control unit according to the invention.

Referring to FIGS. 1 and 2 the suction cautery includes a conventional vacuum hose 10 connected to a vacuum pump not shown, a power supply 12, a power line 14 and a hand piece 16. The hand piece has a conventional connector 18 for the vacuum hose, a diverter body 20 and a tubular sucker tip 22. In a conventional manner when the surgeon desires suction at the end of tip 22 he places his thumb over the diverter hole 21. Upon release, the hole 21 allows the entry of atmospheric pressure to the line, decreasing or eliminating vacuum in the sucker tip 22.

A power connector 24 is secured to the hand piece and connected by line 14 to the power supply 12.

The patient is grounded, hence when a voltage is applied to the sucker tube, if tissue is touched with the tube a flow of current will occur, which can cauterize the tissue and stop the flow of blood.

According to the invention a bleed line 26 is connected to the main vacuum passage at one end and is connected with control tube 28 at the other. The control tube also has an atmospheric port 29 preferably sized substantially larger than the bleed line 26. As shown port 29 is located at an accessible position to the hand of the user. In the preferred embodiment shown, in which the thumb controls hole 21, the port 29 is located for closing by one of the fingers of the user.

The control tube 28 is connected by a vacuum line to a remotely located switch 32 responsive to pressure change. This switch controls the application of voltage to line 14.

Advantageously the pressure switch is of diaphragm type and adapted to respond to a slight change in pressure, e.g. a change of 2 mm. of mercury. One switch that has proved satisfactory in the switch D15–A3 manufactured by the Barksdale Valve Company of Los Angeles, California.

In operation, port 29 is open, a first pressure, perhaps slightly less than atmospheric, is produced in line 30. When the user's finger closes port 29, the bleed line 26 suddenly creates a drop in pressure in the line 30 and the switch 32 is closed, energizing the cautery.

It will be observed that the surgeon has the opportunity of accurately positioning the sucker and using its sucking capability as desired. When he wishes to cauterize he can do so instantaneously by closing port 29. Of the numerous virtues of this arrangement some of the most important are its rapidity of action, ease of control, simplicity, and lack of parts that are difficult to clean or are subject to damage by autoclaving.

It will be noted that the basic control device here illustrated can be employed in other ways. By detaching the electric cord 14 from the hand piece 16 and connecting it for instance to a pair of electrosurgical forceps, the finger of the suction operator can control the coagulating effect of the forceps. The forceps can be held in the other hand of the surgeon or by someone else. Indeed the suction tip 22 may be omitted from the device in certain instances so that only its control function is performed or it can be incorporated in other instruments. Also, by substitution of different switches, pneumatic valves and other vacuum responsive control members for switch 32 other functions necessary at the operating table can be controlled.

Referring to FIG. 3, in this embodiment the power lines 34, 36 are connected to opposed tines of a forceps 37. A metal control tube 38 is secured, e.g. by welding, to one of the tines and a squeeze bulb 40 is secured thereto. The point of connection of the squeeze bulb to the handle portion 39 of the tines is located forwardly of the rearward end of the handle, and axis 42 of the handle portion 39 forms an acute but substantial rearward angle A, e.g. 45° with the axis of the squeeze bulb.

The control line 38 is connected to switch 32a by fluid line 46.

For operation the surgeon squeezes the bulb 40, thus transmitting a pressure pulse to the switch, activating the cautery. So long as the minimal required pressure is maintained, the cautery will remain energized, and upon release it will immediately be de-energized.

Referring to FIG. 4, this embodiment comprises a cautery pencil 50 of the type used for cutting as well as cauterizing, depending upon the nature (e.g. whether the current is damped or not, or the amount of power) of the electric current applied over power line 52. A pressure bulb 54 is oriented in a dependent fashion so as to be located between the palm and fingers of the surgeon while the pencil is held for use. In this embodiment the control tube 56 splits into two branches at the control panel, leading to switches 32b and 32c. The pressure responsive switches are made to respond to substantially different pressure levels. The surgeon, by a skill acquired by use, may adjust the pressure exerted upon the bulb to achieve either one or the other of the pressures. Advantageously the greater pressure controls the switch for the cutting current, giving a further element of control against inadvertent cutting.

Referring to FIG. 5, in this embodiment the squeeze bulb 64 has a dividing wall 65, in effect forming two squeeze compartments, each connected by its own control tube 66, 67, fastened to the pencil 50a, to its own separate control line 68, 69, respectively. Thus in addition to having a difference in degree of hand pressure, the location of the place where hand pressure is applied can be effective to control the current.

Referring to FIG. 6, in this preferred embodiment the squeeze bulb takes the special form of an annular resilient squeeze member 70 surrounding and secured to the shaft 72 of a cautery pencil 74. The pencil itself comprises an electrode 76 secured to the end of the shaft 72, and a connector 78 for the power supply.

A ring 80 is secured to the shaft defining a port 82 to which a flexible control tube 84 is secured, for conducting the fluid pressure to the switch.

With this construction the squeeze forces can be applied towards the shaft, optionally on opposite sides of the pencil shaft, so that the forces are resisted by the pencil shaft or may cancel out altogether. This makes it possible to actuate the device without danger of changing the position of the electrode.

FIG. 8 shows an electrosurgical pencil similar to that of FIGS. 6 and 7 adapted for use in a doctor's office to perform minor surgery without need of a foot pedal.

FIG. 9 shows the cross-section of the single connector to the pencil comprising a flexible hollow tube 70 (defining the passage for fluid pressure from the hand-held instrument to the control) and electrical conductor 71 disposed therewithin (for conducting the current to the hand-held instrument).

In FIG. 11 there is shown diagrammatically a variable control unit 80 having a member 82 which is displaceable in varying degrees in response to variations in fluid pressure conducted to it from the actuator in the surgical field. The actuator shown is in the form of a deflectable member defining a closed volume, specifically here a squeeze bulb 84. As shown by dotted lines this squeeze bulb is attachable for instance to an electrosurgery pencil in which case the variable control unit controls the character of the electrosurgery current, e.g. from mild coagulation (hermostasis), to strong coagulation, to cutting with coagulation, to strong cutting, with increasing pressure of the hand. The variable control unit is shown diagrammatically because it of course can take various forms, but in any construction it will be responsive to various pressure levels to place the instrument in various modes of operation. Thus the instrument may respond to gradual variation in fluid pressure to create a gradual variation (such as gradual opening of an air valve to cause an air powered drill or saw to operate at increasingly fast speeds) or it may have a series of switches or other pressure responsive devices responsive to discrete, different pressure levels transmitted from the sterile field.

In some instances it may be desirable to control the device by a foot pedal positioned to be operated by a person at the operating table. FIG. 10 shows such a pedal in the form of a hemispherical, deflectable rubber top 86 and a flat base 88 defining an enclosed volume. When attached by a hose to control 80 it can substitute for the squeeze bulb 84 with no other change.

Instead of being controlled by positive pressure, varying levels of sub-atmospheric pressure may operate the same system, as diagrammatically indicated in FIG. 11 by the vacuum connector 90 exposing the opposite end of plunger 82 to varying levels of vacuum. Equally, where a series of diaphragm operated switches or valves are employed, a common vacuum connector 90 may be connected to the chambers on one side of all of the diaphragms and a positive pressure connector 92 may be connected to the chambers on the opposite sides of all of the diaphragms.

The sucker of FIG. 12 operates similarly to the embodiment of FIG. 2. However tip 22a is detachable to permit attachment of tip 22b etc., of different sizes. Indeed the tip may be omitted in cases where the hand piece serves only a controlling function as mentioned above for the forceps. FIG. 15 shows such a control. Diverter 21c may here serve to vary the level of vacuum in bleed line 26c, hence in the control line, by occluding varying areas of the diverter opening, to operate a device in various modes. Port 29a can serve to control the "on," "off" condition. This control may thus be useful with the variable control unit described above. Where the vacuum from the surgical field does not itself permit operation of the variable control unit, a vacuum operated amplifier or relay may be interposed to increase the actuating force using either positive or negative pressure.

It will be recognized that all of the foregoing embodiments have numerous advantages. Nothing electrical is required in the actuation device not only removing the explosion hazard but also making the device more reliable and capable of autoclaving. Also none of the embodiments introduce air or foreign matter into the region of the operating table.

What is claimed is:

1. An electrosurgical device constructed for use as a sucker, and adapted for use with a fluid line leading from said device to a vacuum responsive current control means at a remote location, said device comprising a hand piece adapted to be grasped by a user and having an extension in the form of a hollow sucker tube for contact with tissue to be subjected to electrical current, power connection means for a power line to energize said hand piece, source connection means to connect said hollow tube to a vacuum source, fluid connection to connect said hand piece to a fluid line, and electrosurgery control means secured to said hand piece for controllably altering the value of fluid pressure in said fluid line through said fluid connection to actuate said remote current control means, said means for altering the value of fluid pressure in said fluid line comprising a vacuum bleed passage adapted to communicate with said fluid connection and an atmosphere control port, said port located to be engaged and closed by the hand of the user.

2. The electrosurgical device of claim 1 including a diverter passage connected to said sucker tube positioned to be opened and closed by a finger of the user to relieve and apply vacuum to said sucker tube, said bleed passage connected to said sucker tube at a point positioned between said diverter passage and said source connection means.

3. An electrosurgical control system for use with an electrosurgical power unit, said system comprising the electrosurgical device of claim 1 in combination with a remote vacuum responsive electric current control device and a hollow, flexible fluid-conducting tube adapted for connecting said electrosurgical device with said current control device.

4. An electrosurgical device adapted for use with a fluid line leading from said device to a pressure responsive current control means at a remote location, said device comprising a hand piece adapted to be grasped by a user and connectable with an electrode for contact with tissue to be subjected to electrical current, said hand piece including electrosurgery control means in the form of a positive pressure fluid displacement member defining a confined volume having at least one portion deflectable by squeeze of the hand of the user, to reduce said volume, and a fluid connection to said volume for communicating with said fluid line, whereby fluid pressure above atmospheric pressure can be transmitted by the user from said device to said remote current control means for activating the current on said electrode.

5. The electrosurgical device of claim 4 wherein said fluid displacement member is defined by opposed elastomeric walls constructed to be deflected toward each other.

6. The electrosurgery device of claim 5 wherein said fluid displacement member comprises an elastomeric bulb having one open end, a connector member connected to said end and mountable upon said electrode with said bulb extending laterally therefrom in a position to be disposed between the palm and fingers of the user while the user holds the electrode in operating position.

7. An electrosurgery control system for use with an electrosurgical power unit, said system comprising the electrosurgical device of claim 4 in combination with a separate remote positive pressure responsive current control means and a hollow, flexible control tube adapted for connecting said electrosurgical device with said current control means.

8. The electrosurgery control system of claim 7 wherein said electric current control means is responsive to two different pressure values to apply respectively two different electric current values to said electrode, said fluid displacement member adapted, with different movements of the hand of the user, to generate two different positive pressure values, one adapted to control a cauterizing current and the other adapted to control a cutting current.

9. The electrosurgical device of claim 4 wherein said hand piece constitutes an elongated shaft, and said positive pressure fluid displacement member comprises an elastomeric wall secured and sealed to said shaft defining said volume.

10. The electrosurgical device of claim 9 wherein said elastomeric wall comprises two portions located on opposite sides of said shaft and spaced therefrom, adapted to be squeezed toward each other for displacing fluid into said control line.

11. The electrosurgical device of claim 10 wherein said elastomeric wall is defined by an annular member surrounding said shaft.

12. An electrosurgical control system comprising a hand piece adapted to be grasped by a user and including an extension for contact with tissue to be subjected to electrical current, a remote current controlling means and a flexible connector between said hand piece and said electric current control means, said hand piece including a member adapted to be squeezed with varying pressure, said flexible connector adapted to transmit said varying pressure and said current controlling means responsive to different pressures to apply different electrosurgical currents to said hand piece.

References Cited

UNITED STATES PATENTS

| | | | |
|---|---|---|---|
| 2,275,167 | 3/1942 | Bierman | 128—303.17 |
| 2,618,267 | 11/1952 | Hanriot | 128—303.14 |
| 2,708,933 | 5/1955 | August | 128—303.14 |
| 2,888,928 | 6/1959 | Seiger | 128—303.17 |
| 3,058,470 | 10/1962 | Seeliger et al. | 128—303.14 |

L. W. TRAPP, Primary Examiner

U.S. Cl. X.R.

128—303.17